(12) United States Patent
Kataoka et al.

(10) Patent No.: US 12,025,833 B2
(45) Date of Patent: Jul. 2, 2024

(54) OPTICAL WAVEGUIDE ELEMENT

(71) Applicant: SUMITOMO OSAKA CEMENT CO., LTD., Tokyo (JP)

(72) Inventors: Yu Kataoka, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 234 days.

(21) Appl. No.: 17/764,950

(22) PCT Filed: Sep. 23, 2020

(86) PCT No.: PCT/JP2020/035813
§ 371 (c)(1),
(2) Date: Mar. 29, 2022

(87) PCT Pub. No.: WO2021/065624
PCT Pub. Date: Apr. 8, 2021

(65) Prior Publication Data
US 2022/0291447 A1    Sep. 15, 2022

(30) Foreign Application Priority Data

Sep. 30, 2019  (JP) ................................ 2019-178212

(51) Int. Cl.
*G02B 6/125* (2006.01)
*G02B 6/12* (2006.01)
(52) U.S. Cl.
CPC .... *G02B 6/125* (2013.01); *G02B 2006/12097* (2013.01)

(58) Field of Classification Search
CPC .......... G02B 6/125; G02B 2006/12097; G02B 6/1345; G02B 2006/1204; G02B 6/29355; G02B 6/2804; G02B 6/122; G02F 1/01; G02F 1/035
See application file for complete search history.

(56) References Cited

U.S. PATENT DOCUMENTS 9,304,370 B2 *  4/2016  Kondou ................. G02B 6/125
2002/0006245 A1  1/2002  Kubota
(Continued)

FOREIGN PATENT DOCUMENTS

JP    H09005548 A    1/1997
JP    200223123 A    1/2002
(Continued)

*Primary Examiner* — John Bedtelyon
(74) *Attorney, Agent, or Firm* — IpHorgan Ltd.

(57) ABSTRACT

Provided is an optical waveguide element that prevents leaked light generated at a forking section from entering a downstream optical waveguide such as another forking section, thereby affording minimal degradation of optical characteristics. The optical waveguide is characterized in that: at least one of two fork waveguides (20a, 20b) forking from a first forking section (20) comprises a second forking section (21, 22); slab waveguides (3c-1 to 3c-3) are formed between the two fork waveguides; and between the first forking section and the second forking section, slits (41, 42) are formed that partition the slab waveguides into a first slab waveguide area (3c-1) close to the first forking section and second slab waveguide areas (3c-2, 3c-3) close to the second forking section(s).

10 Claims, 11 Drawing Sheets

(56) References Cited

U.S. PATENT DOCUMENTS

| | | | |
|---|---|---|---|
| 2006/0110089 A1* | 5/2006 | Ichikawa | ............... G02F 1/225 385/14 |
| 2006/0165348 A1 | 7/2006 | Iio | |
| 2010/0046964 A1 | 2/2010 | Makela | |
| 2012/0207425 A1 | 8/2012 | Kondou | |
| 2015/0205181 A1 | 7/2015 | Kondou | |

FOREIGN PATENT DOCUMENTS

| JP | 200493905 A | 3/2004 |
|---|---|---|
| JP | 2006178252 A | 7/2006 |
| JP | 201175906 A | 4/2011 |
| JP | 201435451 A | 2/2014 |

* cited by examiner

FIG. 16

OPTICAL WAVEGUIDE ELEMENT

CROSS REFERENCE TO RELATED APPLICATIONS

This application is a national stage completion application of PCT Application No. PCT/JP2020/035813, filed Sep. 23, 2020, and claims priority from Japanese Patent Application No. 2019-178212, filed Sep. 30, 2019. Each of these applications is incorporated by reference herein in its entirety.

TECHNICAL FIELD

The present invention relates to an optical waveguide element, and more particularly to an optical waveguide element having an optical waveguide having a branch portion formed on a substrate and having a slab waveguide for guiding a high-order mode light beam leaked from the branch portion.

BACKGROUND ART

In the field of optical communication or the field of optical measurement, an optical waveguide element in which an optical waveguide is formed on a substrate such as an optical modulator is widely used. As a method of forming an optical waveguide, a method of forming an optical waveguide by thermally diffusing a metal such as Ti on a substrate made from quartz, lithium niobate, or a semiconductor material, or a method of forming an optical waveguide by forming a ridge-shaped protruding portion is known.

The optical waveguide includes a branch portion and a Y-branch coupler, like the Mach-Zehnder type optical waveguide. Further, in recent years, for multi-level modulation or polarization multiplexing, for example, a nested waveguide (see, for example, FIG. 1) in which a plurality of Mach-Zehnder type optical waveguides are nested, an optical waveguide element in which a plurality of Mach-Zehnder type optical waveguides are disposed on a substrate has also been put into practical use.

Figure 1:
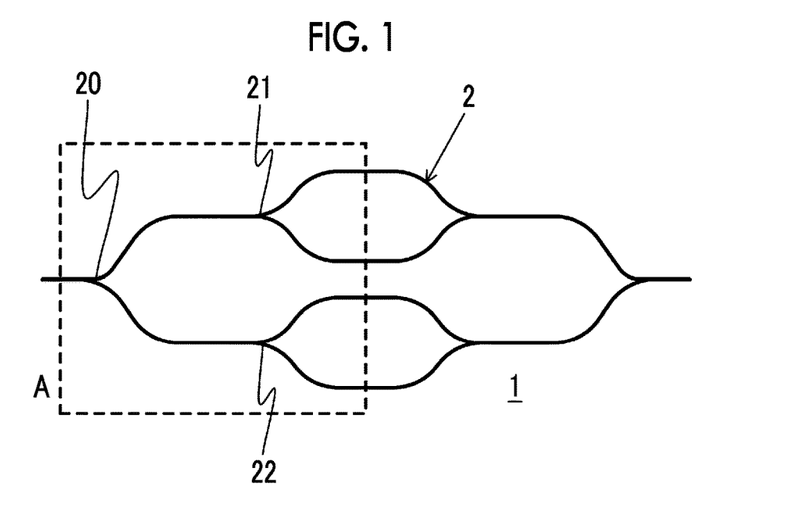
FIG. 1 is a diagram showing a nested optical waveguide used in an optical waveguide element.

In order to realize a high ON/OFF extinction ratio in the optical modulator, it is necessary to suppress a minute deviation of the branch ratio in the branch portion in the optical waveguide. As shown in FIG. 1, when the optical waveguide 2 formed on the substrate 1 has a plurality of branch portions (20 to 22), the light (high-order mode light beam) leaked at the upstream branch portion 20 in the direction in which the light propagates is input to the downstream branch portions (21, 22), and light interference occurs. Such light interference is particularly a cause of deviation in the branch ratio.

Figure 2:
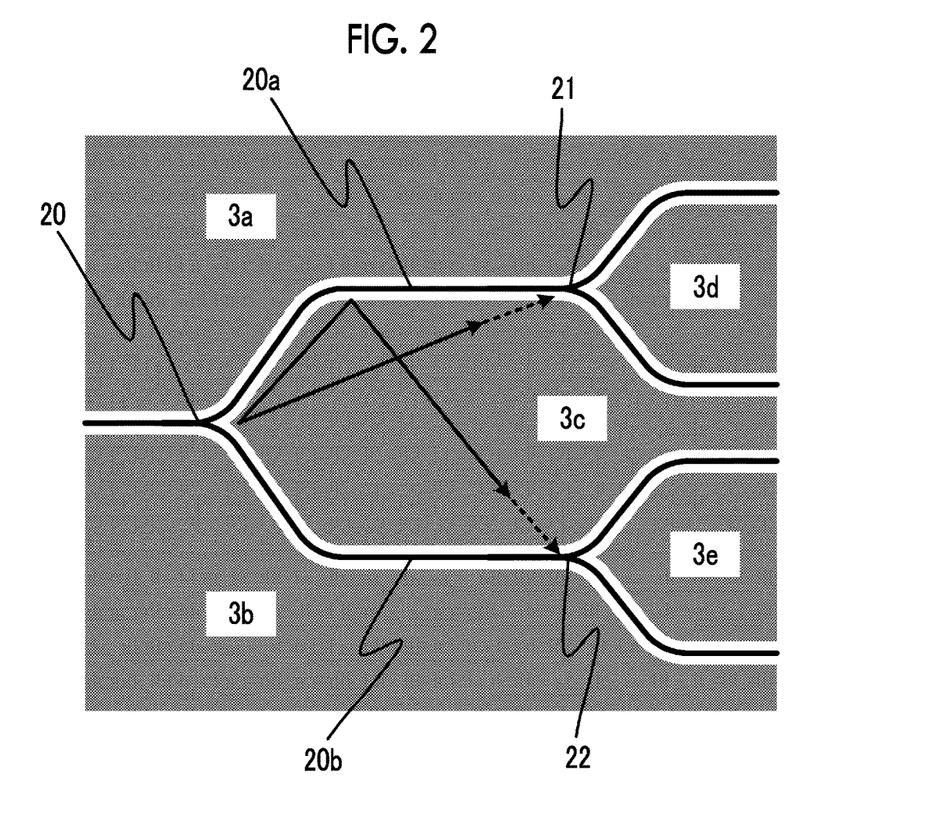
FIG. 2 is an enlarged view of the dotted line region A of FIG. 1 and is a diagram showing a model in which a slab waveguide is disposed around the optical waveguide.

Patent Literature No. 1 discloses that a slab waveguide is provided around an optical waveguide to provide an absorption region for absorbing a high-order mode light beam. However, as shown in FIG. 2, even when the slab waveguides (3a to 3e) are formed around the optical waveguide, the high-order mode light beam leaked at the branch portion 20 propagates in the slab waveguide 3c, transfers to the optical waveguide located downstream such as the other branch portions (21, 22), and interferes with the waveguide light guided by the optical waveguide. Moreover, this phenomenon becomes particularly remarkable when the thickness of the substrate on which the optical waveguide is formed is a thin plate of 20 μm or less.

CITATION LIST

Patent Literature

[Patent Literature No. 1] Japanese Laid-open Patent Publication No. 2011-75906
[Patent Literature No. 2] Japanese Laid-open Patent Publication No. 2014-35451

SUMMARY OF INVENTION

Technical Problem

The purpose of the present invention is to solve the above-described problems, and to provide an optical waveguide element that controls the propagation path of a leaked light beam such as a high-order mode light beam generated in the branch portion, prevents interference with the waveguide light propagating in the downstream optical waveguide such as another branch portion, and has less deterioration in optical characteristics.

Solution to Problem

In order to solve the above problems, an optical waveguide element of the present invention has the following technical features.

(1) An optical waveguide element in which an optical waveguide is formed on a substrate, in which in the optical waveguide, at least one of two branched waveguides branched at a first branch portion has a second branch portion, a slab waveguide is formed between the two branched waveguides, and a slit that divides the slab waveguide into a first slab waveguide region near the first branch portion and a second slab waveguide region near the second branch portion is formed between the first branch portion and the second branch portion.

(2) In the optical waveguide element according to (1) above, a refractive index of the slit is set lower than a refractive index of the slab waveguide region.

(3) In the optical waveguide element according to (1) or (2) above, the first slab waveguide region is disposed along an optical waveguide formed on a downstream side of the second branch portion.

(4) In the optical waveguide element according to any one of (1) to (3), a shape of a boundary between the slit and the second slab waveguide region has a plurality of protruding portions projecting into the second slab waveguide region, and is set such that a high-order mode light beam propagating in the second slab waveguide region travels into the first slab waveguide region or to an outside an entire optical waveguide.

(5) In the optical waveguide element according to any one of (1) to (4) above, the optical waveguide includes a Y-branch coupler that combines two branched waveguides branched at the first branch portion, and a shape of a portion of the first slab waveguide region close to the Y-branch coupler is set such that a high-order mode light beam output from the first slab waveguide region travels to cross the branched waveguide while avoiding the Y-branch coupler.

(6) In the optical waveguide element according to any one of (1) to (5) above, an absorbent material that absorbs a high-order mode light beam propagating in the slab waveguide is disposed in at least a part of the first slab waveguide region.

Advantageous Effects of Invention

According to the present invention, in an optical waveguide element in which an optical waveguide is formed on a substrate, in the optical waveguide, at least one of two branched waveguides branched at a first branch portion has a second branch portion, a slab waveguide is formed between the two branched waveguides, and a slit that divides the slab waveguide into a first slab waveguide region near the first branch portion and a second slab waveguide region near the second branch portion is formed between the first branch portion and the second branch portion, so that it is possible to provide an optical waveguide element that controls the propagation path of a leaked light beam such as a high-order mode light beam generated in the first branch portion, prevents interference with the waveguide light propagating in the downstream optical waveguide such as the second branch portion, and has less deterioration in optical characteristics.

DESCRIPTION OF EMBODIMENTS

Hereinafter, the present invention will be described in detail with reference to preferred examples.

Figure 3:
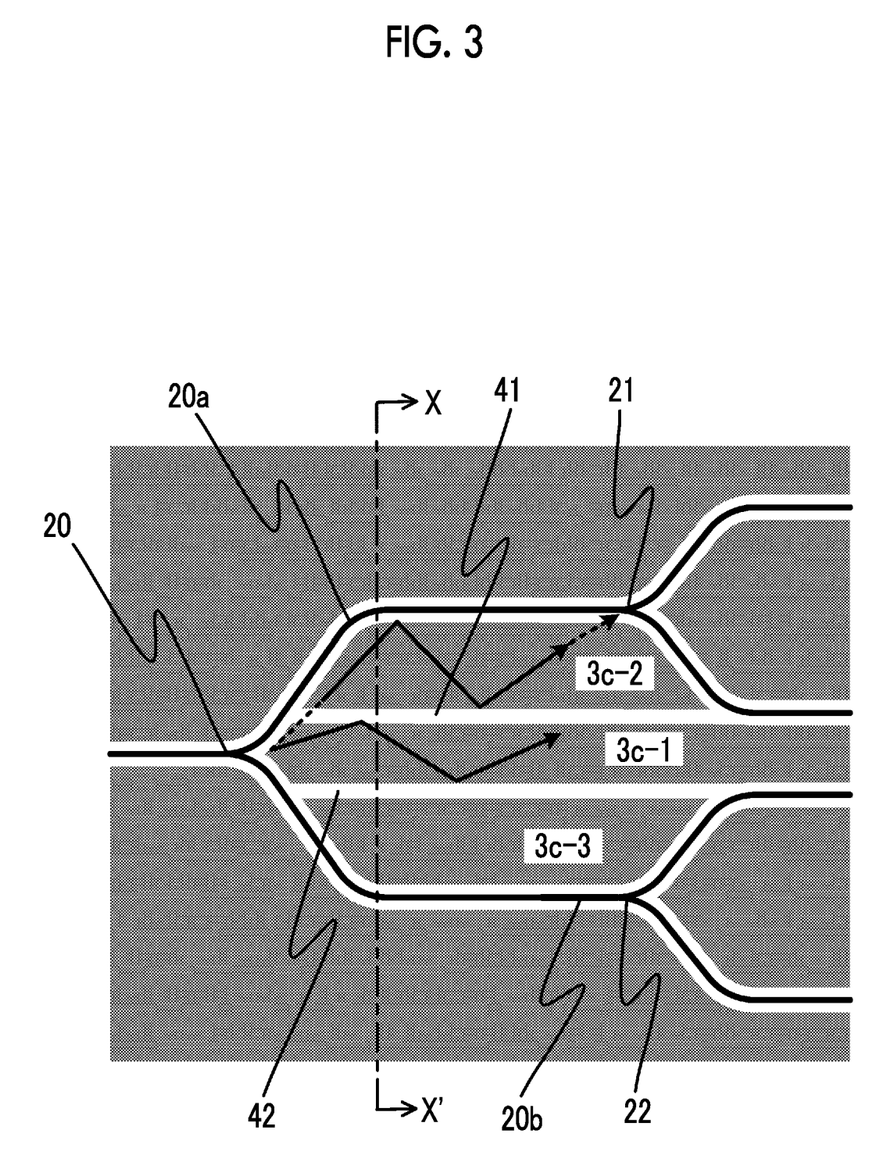
FIG. 3 is a diagram showing a first embodiment of the optical waveguide element of the present invention.

The optical waveguide element of the present invention is, as shown in FIG. 3, an optical waveguide element in which an optical waveguide is formed on a substrate, in the optical waveguide, at least one of two branched waveguides (20a, 20b) branched at a first branch portion (20) has second branch portions (21, 22), slab waveguides (3c-1 to 3c-3) are formed between the two branched waveguides, and slits (41, 42) that divide the slab waveguides into a first slab waveguide region (3c-1) near the first branch portion and second slab waveguide regions (3c-2, 3c-3) near the second branch portion are formed between the first branch portion and the second branch portion.

The material of the substrate constituting the optical waveguide element of the present invention is not particularly limited as long as the optical waveguide can be formed on the substrate, such as quartz, lithium niobate, and a semiconductor material. When modulating light waves propagating in the optical waveguide in an electric field formed by an electrode of an optical modulator or the like, a substrate having an electro-optic effect such as lithium niobate or lithium tantalate may be used. Further, when a thin substrate of 20 µm or less is used, a leaked light beam (high-order mode light beam) usually tends to be guided into the substrate including the slab waveguide. On the other hand, by applying the present invention, it becomes easy to control the propagation path of the leaked light beam, and it is possible to suppress the leaked light beam from interfering with the waveguide light propagating in the optical waveguide.

Figure 16:
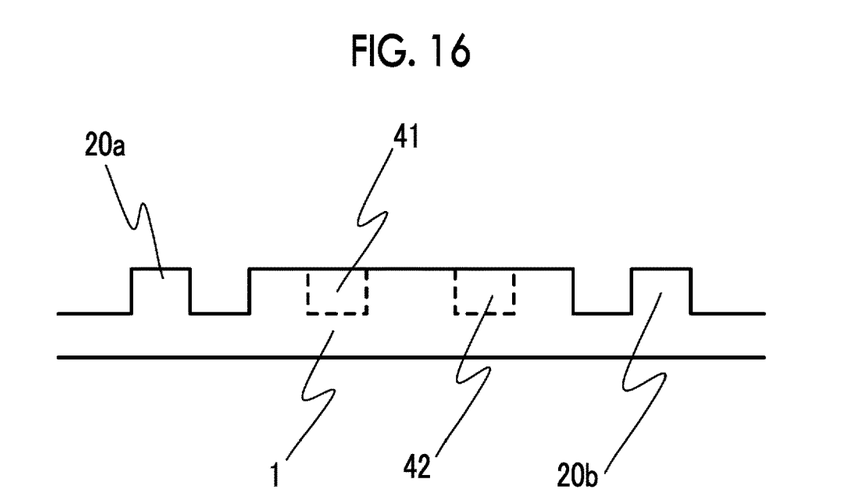
FIG. 16 is a cross-sectional view taken along a dashed line XX' in FIG. 3.

As a method of forming an optical waveguide, a method of thermally diffusing a metal such as Ti into a substrate to form a portion having a higher refractive index than that of the substrate material, or a method of forming irregularities on the substrate surface to form a ridge-type waveguide (rib waveguide) is applicable. FIG. 16 shows a cross section of the dashed line XX' of FIG. 3, and the branched waveguides (20a, 20b) which are optical waveguides are formed of a rib-type waveguide provided with a protruding portion of the substrate 1. Further, the slab waveguide can also be formed by Ti diffusion, or by disposing a high refractive index medium having a higher refractive index than that of the substrate 1, or by forming a convex rib waveguide. As shown by the dotted lines in FIG. 16, the slits (41, 42) described later can be provided by forming recess portions (ridges) in a part of the substrate 1. Further, the slit can be formed by a method in which Ti diffusion or arrangement of a high refractive index medium is not performed according to the shape of the slit. The refractive index of the slit portion needs to be set lower than the refractive index of the slab waveguide.

The feature of the present invention is that the slab waveguide between the first branch portion (20) and the second branch portions (21, 22) is divided into a plurality of regions (3c-1 to 3c-3) by slits (41, 42). This makes it possible to suppress the high-order mode light beam leaked from the first branch portion and its vicinity (hereinafter referred to as "first branch portion and the like") from inputting to the second branch portion and the optical waveguide in the vicinity thereof, and confine the high-order mode light beam in the first slab waveguide region (3c-1) near the first branch portion (see the arrow propagating in region 3c-1 of FIG. 3).

However, a part of the light leaked from the first branch portion or the like crosses the slits (41, 42) and reaches the second slab waveguide regions (3c-2, 3c-3) near the second branch portion. As shown in FIG. 3, such a leaked light beam stays in the second slab waveguide region (for example, 3c-2) and finally is input to the second branch portion and the optical waveguide in the vicinity thereof.

Figure 4:
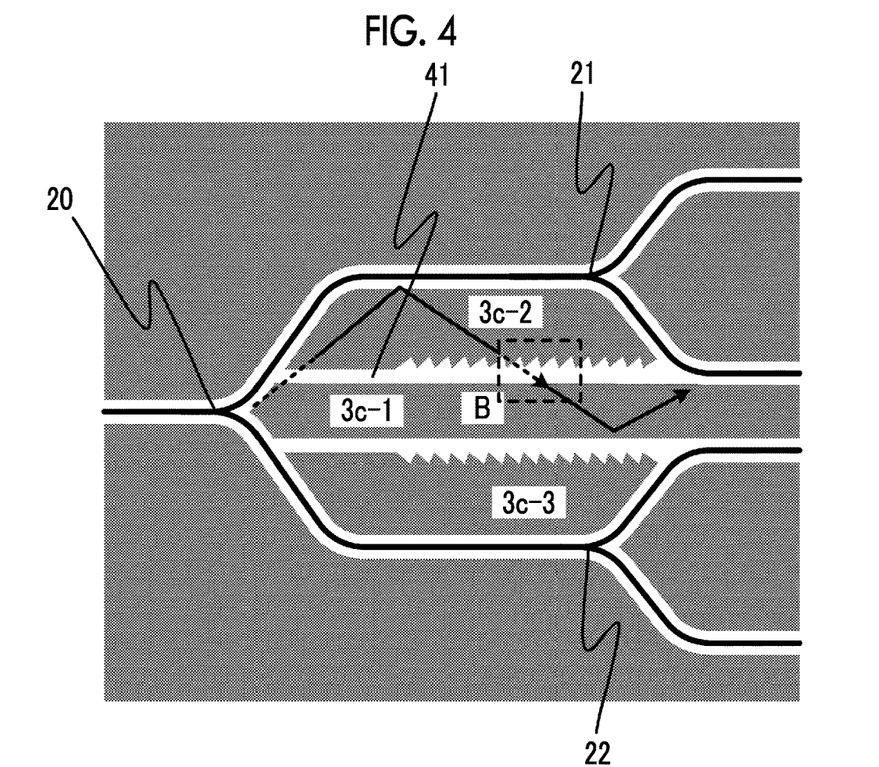
FIG. 4 is a diagram showing a second embodiment of the optical waveguide element of the present invention.
Figure 5:
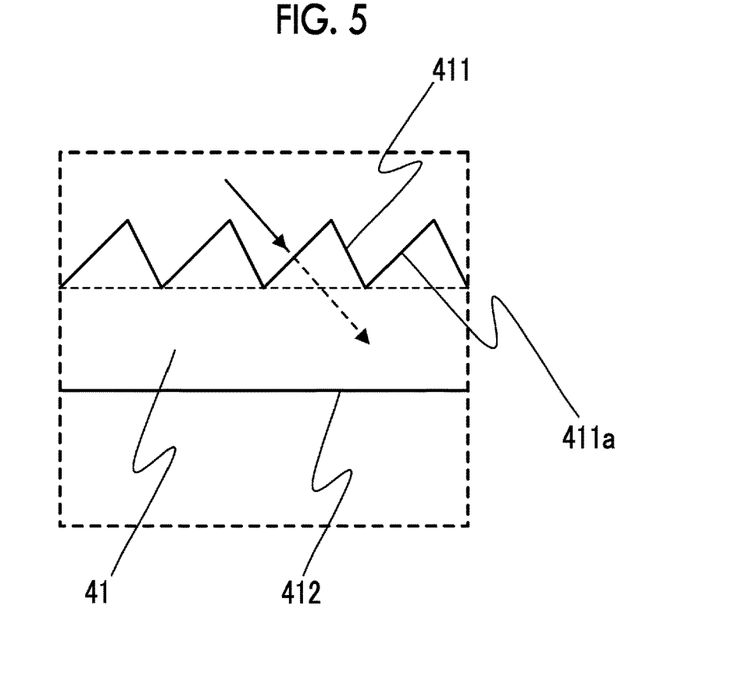
FIG. 5 is an enlarged view of a dotted line region B in FIG. 4.

In the present invention, in order to further solve such a problem, as shown in FIGS. 4 and 5, the shape of the boundary (411) between the slit (41) and the second slab waveguide region (3c-2) is composed of, for example, a plurality of triangular wave-shaped protruding portions. With this configuration, the confinement of the leaked light beam at the boundary is released, and the leaked light beam is guided from the second slab waveguide region (3c-2) to the first slab waveguide region (3c-1). Then, since the leaked light beam can be confined in the first slab waveguide region (3c-1), the input of the leaked light beam to the second branch portion or the like can be suppressed. In the model of FIG. 5, the shape of a part (411a) of the boundary (411) is set to an angle at which the leaked light beam can pass through. As will be described later, the shape of a part of the boundary is not limited to the shape that allows the leaked light beam to pass through, and may be a shape that reflects the leaked light beam toward the first slab waveguide region.

Figure 6:
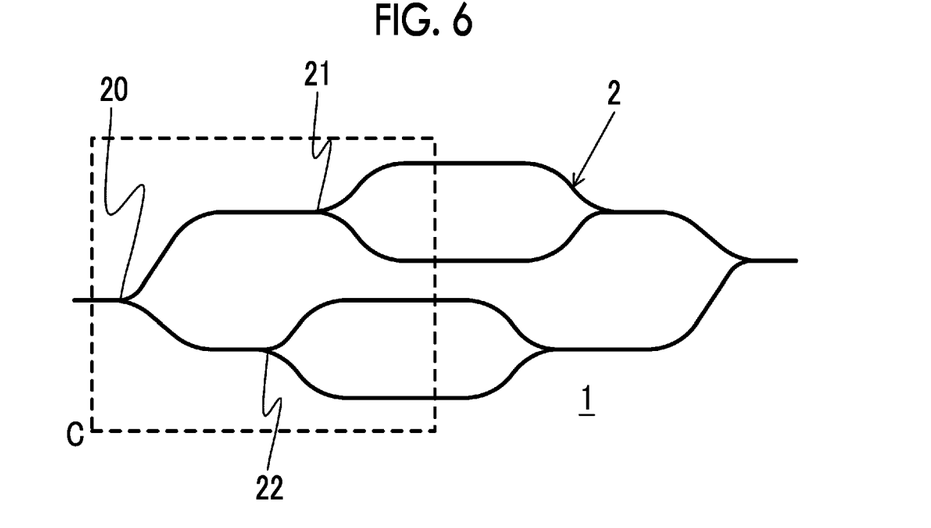
FIG. 6 is a diagram showing another nested optical waveguide used in an optical waveguide element.

FIG. 6 is a modification example of the nested optical waveguide, in which the positions of the two Mach-Zehnder type optical waveguides provided in the branched waveguide are staggered with respect to the lateral direction in FIG. 6. Even in such a case, the present invention can be applied in the same manner as in the above-described embodiments.

Figure 7:
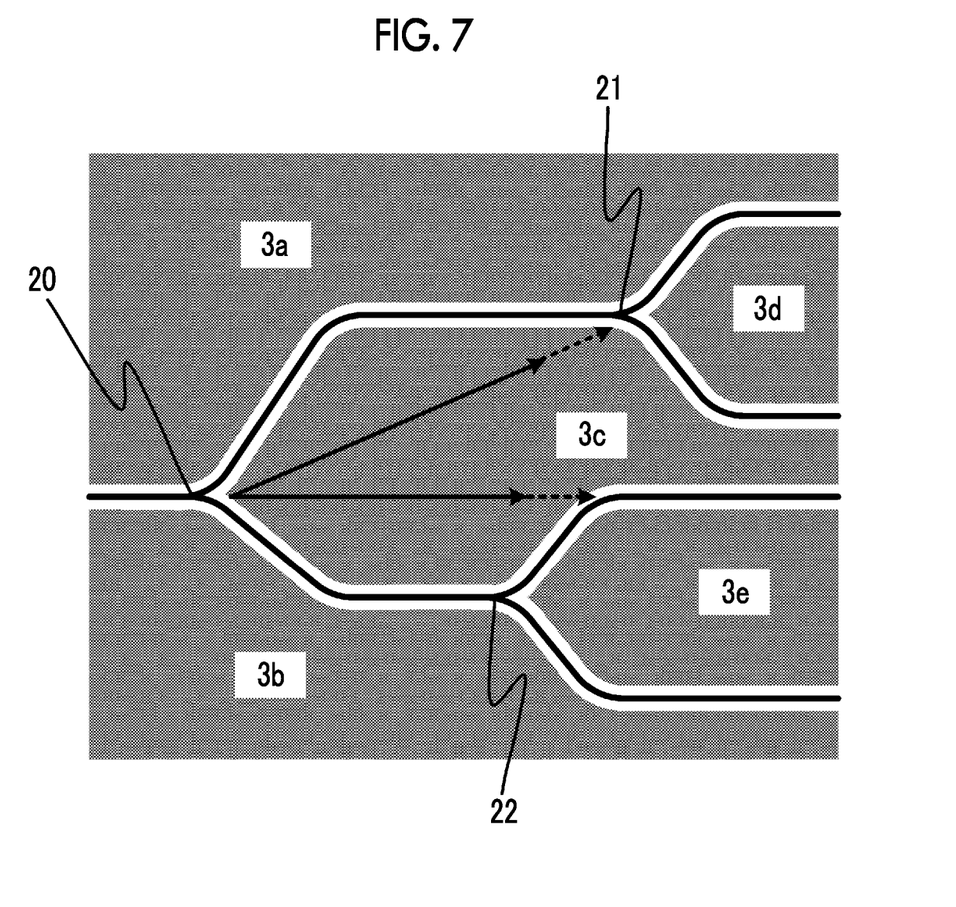
FIG. 7 is an enlarged view of the dotted line region C of FIG. 6 and is a diagram showing a model in which a slab waveguide is disposed around the optical waveguide.
Figure 8:
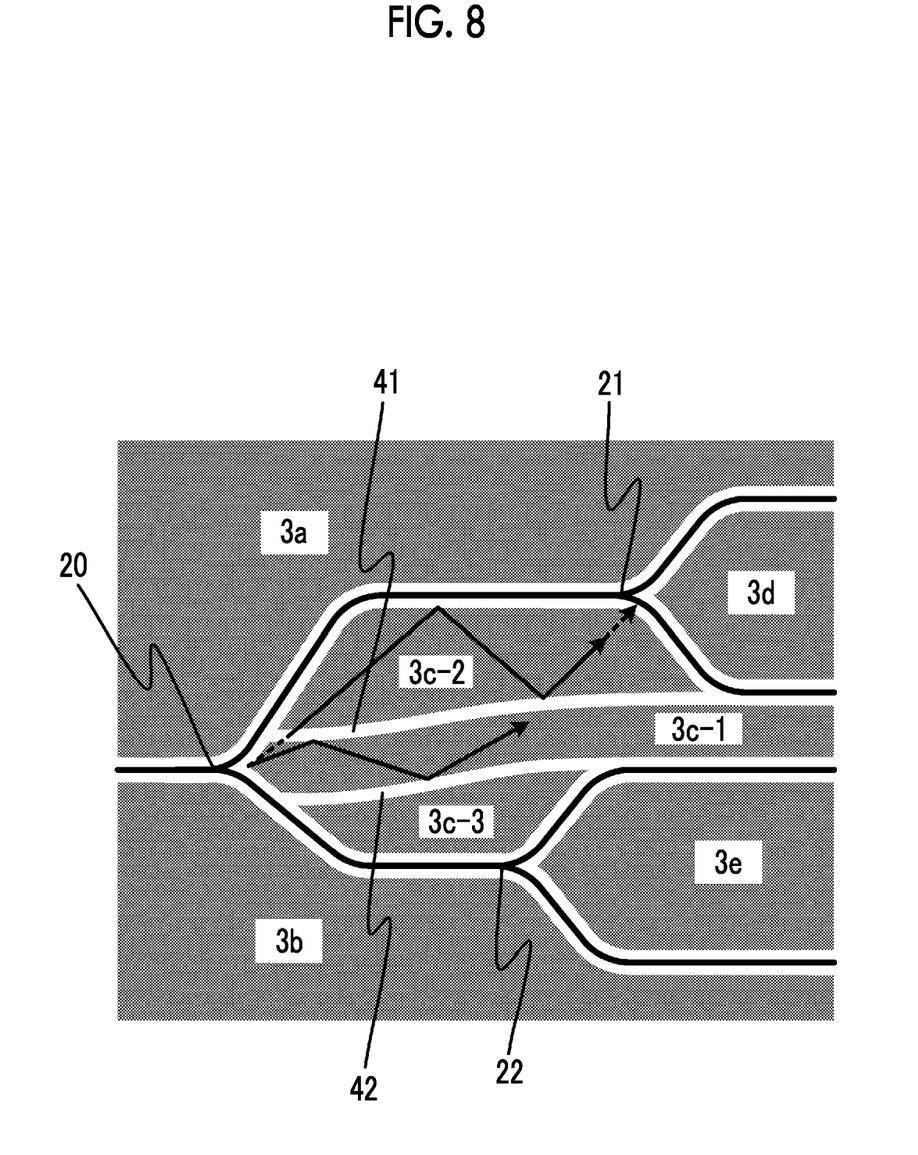
FIG. 8 is a diagram showing a third embodiment of the optical waveguide element of the present invention.
Figure 9:
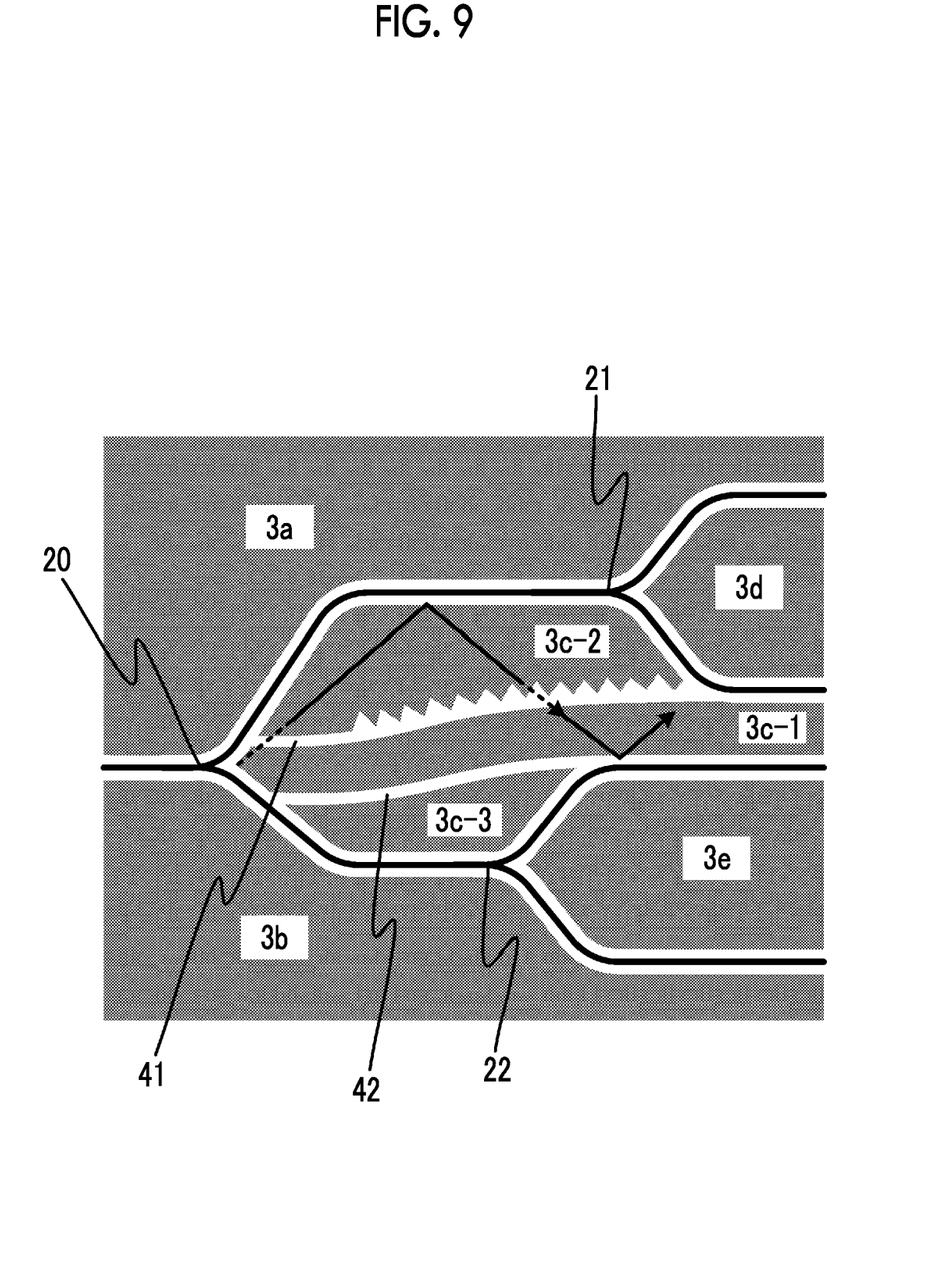
FIG. 9 is a diagram showing a fourth embodiment of the optical waveguide element of the present invention.
Figure 10:
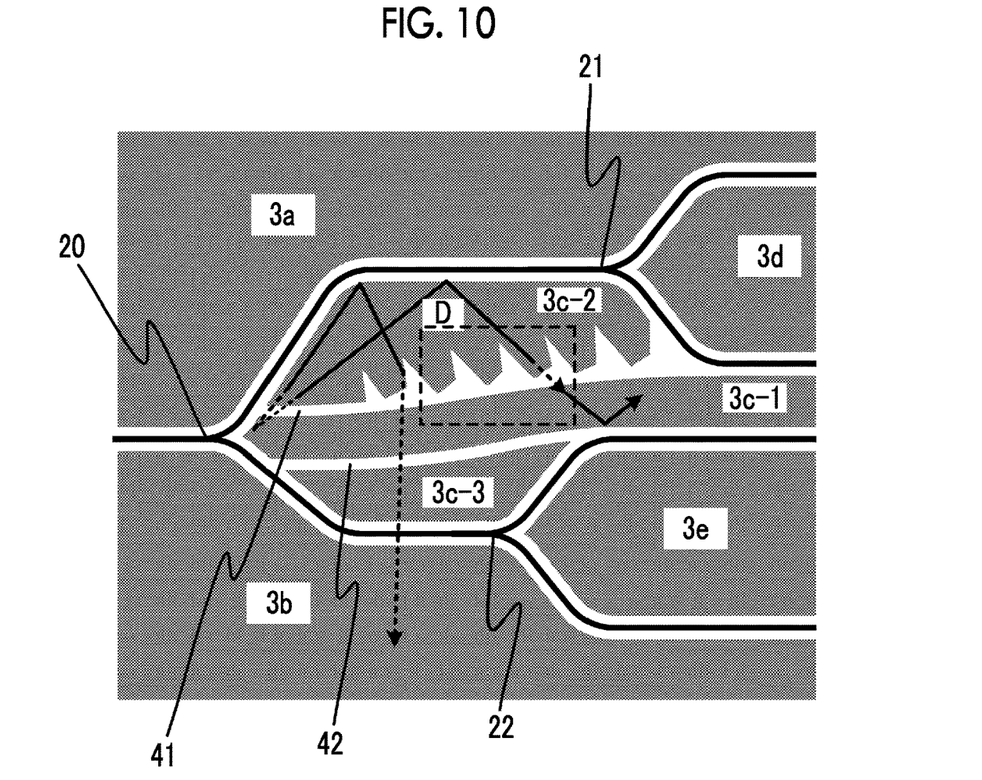
FIG. 10 is a diagram showing a fifth embodiment of the optical waveguide element of the present invention.

FIGS. 7 to 10 are enlarged views of the dotted line region C of FIG. 6, and in particular, FIGS. 8 to 10 show embodiments of the optical waveguide element of the present invention.

FIG. 7 shows slab waveguides (3a to 3e) provided around the optical waveguide in order to remove the leaked light beam (high-order mode light beam). In this case, as in FIG. 2, the leaked light beam leaked from the first branch portion (20) and its vicinity propagates inside the slab waveguide (3c), and reaches the second branch portions (21, 22) and its vicinity. As a result, the waveguide light propagating in the optical waveguide and the leaked light beam interfere with each other, which causes deterioration of the optical characteristics.

In order to solve this problem, as in FIG. 3, as shown in FIG. 8, the slab waveguide is divided into a first slab waveguide region (3c-1) near the first branch portion (20) and second slab waveguide regions (3c-2, 3c-3) near the second branch portion (21, 22), by using slits (41, 42). The shape of the slit is not limited to a straight line as shown in FIG. 3, but may be a curved line as shown in FIG. 8.

Further, in order to guide the leaked light beam confined in the second slab waveguide region (for example, 3c-2) to the first slab waveguide region (3c-1), as shown in FIG. 9, it is possible to form the shape of the boundary between the slit (41) and the second slab waveguide region (3c-2) in a triangular wave shape as shown in FIG. 5.

Figure 11:
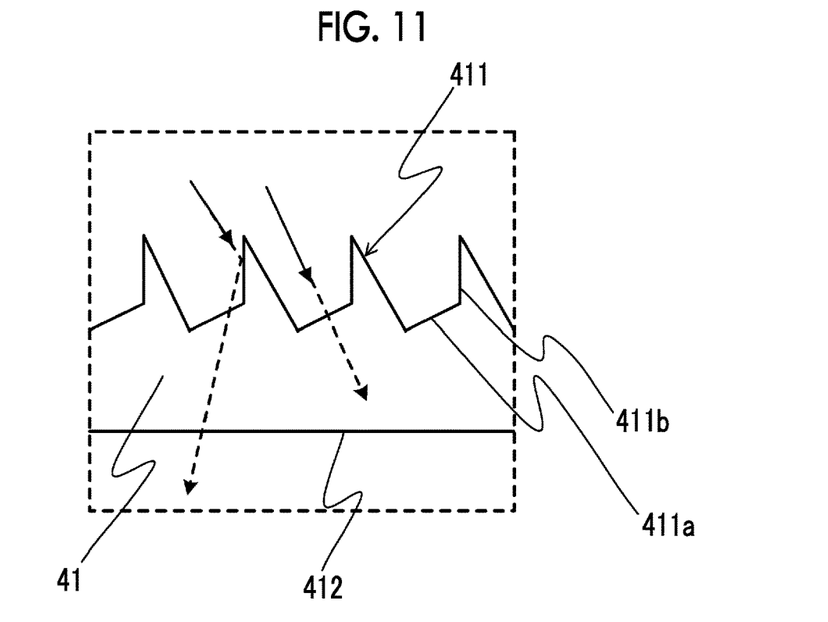
FIG. 11 is an enlarged view of a dotted line region D in FIG. 10.

Further, as shown in FIGS. 10 and 11, the shape of the slit can be formed by a combination of the shape of the boundary (411), the portion (411a) through which the leaked light beam is transmitted and the portion (411b) through which the leaked light beam are reflected. FIG. 11 is an enlarged view of a dotted line region D of FIG. 10. The leaked light beam input at an acute angle with respect to the propagation direction of the leaked light beam in the first slab waveguide region is not confined in the first slab waveguide region (3c-1), and follows a path that travels outside the entire optical waveguide, for example, as shown in FIG. 10.

Figure 12:
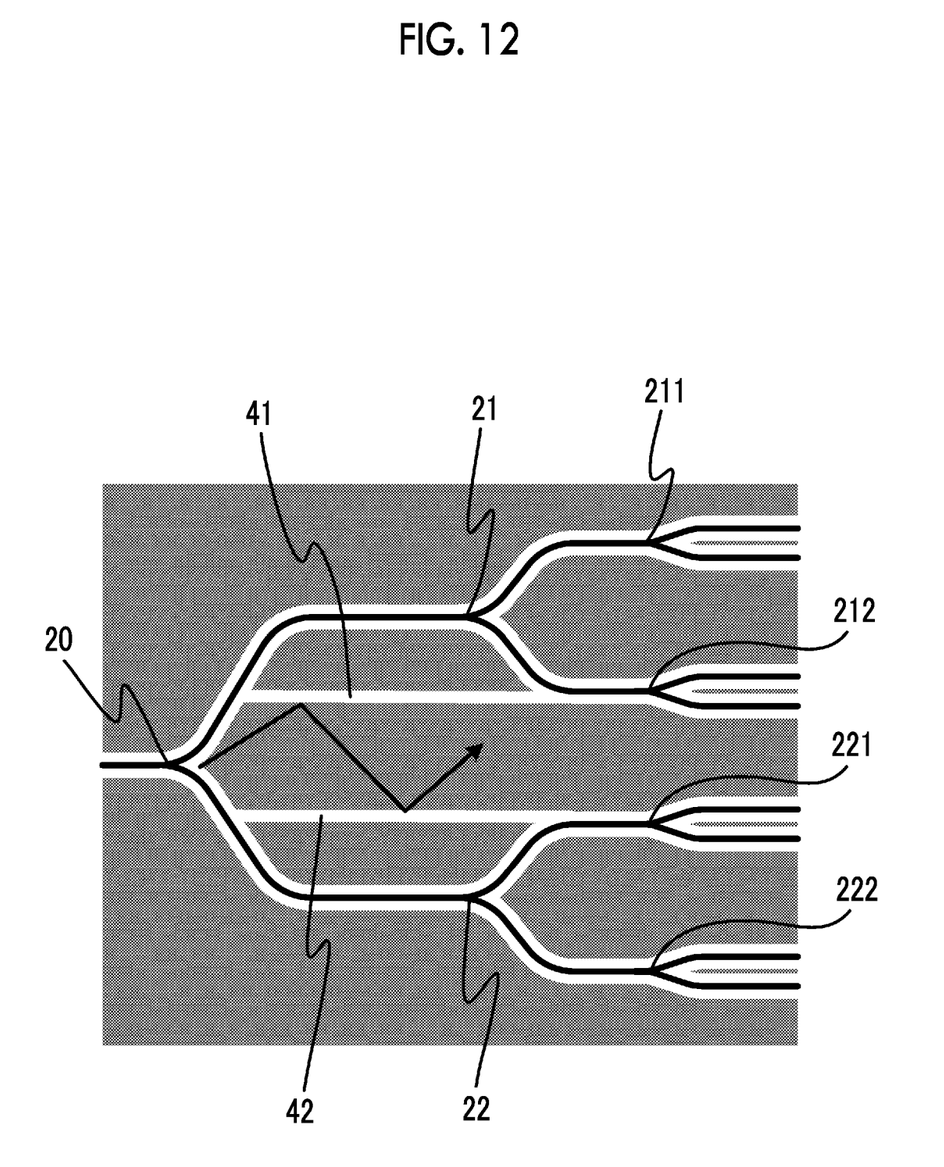
FIG. 12 is a diagram showing a sixth embodiment of the optical waveguide element of the present invention.
Figure 13:
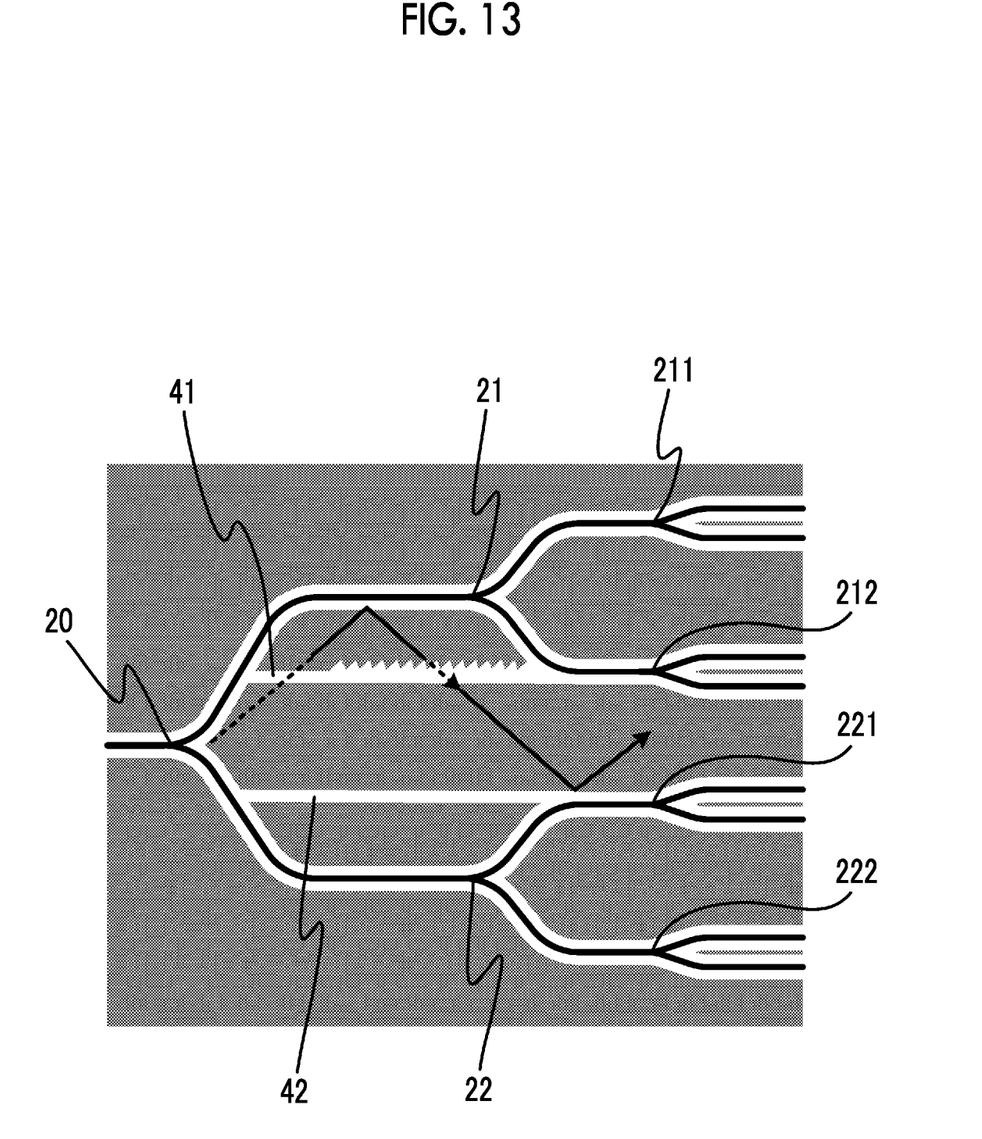
FIG. 13 is a diagram showing a seventh embodiment of the optical waveguide element of the present invention.

In FIGS. 12 and 13, four Mach-Zehnder-type waveguides (input-side Y branch portions 211 to 222) are disposed in parallel, and each Mach-Zehnder-type waveguide is connected to a plurality of branch portions (20 to 22). As described above, even when the optical waveguide has a complicated shape, as shown in FIG. 12, a slab waveguide is formed in a region sandwiched between the branched waveguides, and slits (41, 42) for dividing the slab waveguide is formed, which makes it possible to suppress that most of the leaked light beam leaked from the first branch portion (20) or the like is input to the second branch portions (21, 22) or the like.

Further, as shown in FIG. 13, by adopting the shape of the boundary (411) shown in FIG. 5 for apart of the slit, the leaked light beam in the second slab waveguide region can be guided to the first slab waveguide region.

Figure 14:
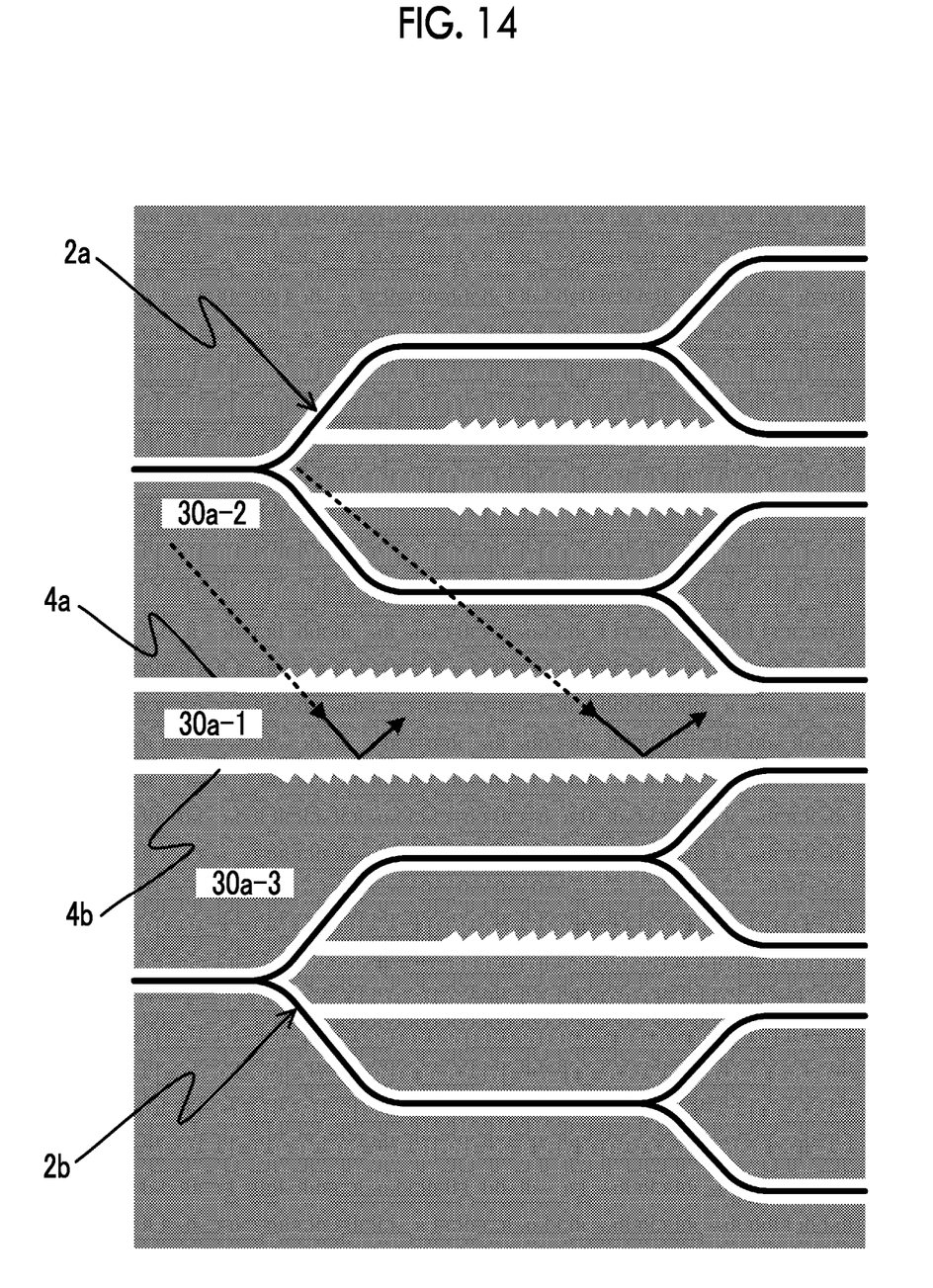
FIG. 14 is a diagram showing an eighth embodiment of the optical waveguide element of the present invention.

Further, in FIG. 14, two nested optical waveguides are disposed in parallel, which corresponds to the case where a plurality of independent optical waveguides are formed on the same substrate. Slits (4a, 4b) that divide the slab waveguide are disposed between the independent optical waveguides (2a, 2b) to divide the slab waveguide into slab waveguide regions (30a-1 to 30a-3). Then, a propagation path (30a-1) for collecting the leaked light beam and guiding the leaked light beam to the rear side of the substrate is provided. The role of the slab waveguide region (30a-1) is basically the same as that of the first slab waveguide region described above, and it is also possible to provide a protruding portion of a triangular wave shape as the shape of the boundary portion of the slit.

It is possible to guide the leaked light beam near the input end of the optical waveguide or the leaked light beam emitted to the outside of the entire independent optical waveguide (2a in FIG. 14), to the slab waveguide region (30a-1).

Figure 15:
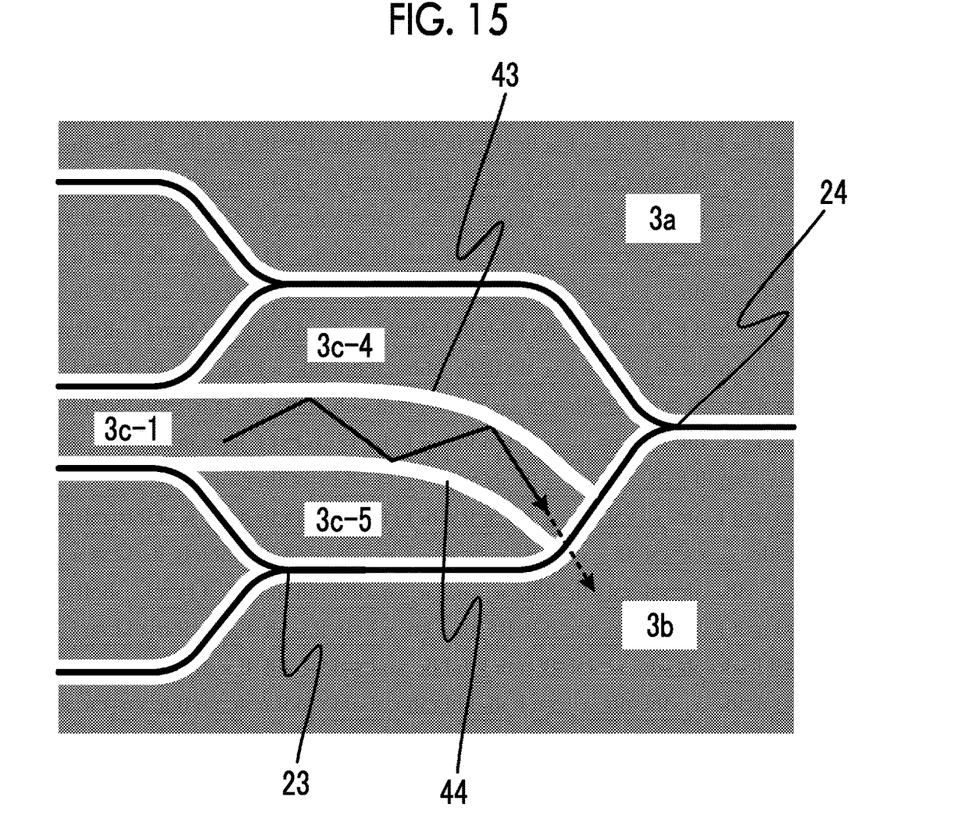
FIG. 15 is a diagram showing a ninth embodiment of the optical waveguide element of the present invention.

FIG. 15 shows the structure of the rear stage of the optical waveguide, shown on the right side of the dotted line region A in FIG. 1. As shown in FIGS. 3 and 15, the first slab waveguide region (3c-1) is disposed along an optical waveguide formed on a downstream side of the second branch portions (21, 22).

Further, in order to derive the leaked light beam guided by the first slab waveguide region (3c-1) to the outside of the substrate, it is possible to adopt the configuration as shown in FIG. 15. In FIG. 15, the optical waveguide includes a Y-branch coupler (24) that combines two branched waveguides branched at the first branch portion (20) in FIG. 3, and a shape of a portion of the first slab waveguide region (3c-1) close to the Y-branch coupler is set such that the high-order mode light beam output from the first slab waveguide region travels to cross the branched waveguide (between reference numerals 23 and 24) while avoiding the Y-branch coupler (24).

With the configuration as shown in FIG. 15, it is possible to suppress the leaked light beam (high-order mode light beam) from being input to the optical waveguide of the Y-branch coupler and the vicinity thereof.

Further, as disclosed in Patent Literature 1 or 2, in order to absorb the leaked light beam propagating in the first slab waveguide region, an absorbent material that absorbs the high-order mode light beam propagating the slab waveguide may be disposed in at least a part of the first slab waveguide region. As the absorbent material, a conductive metal material is suitable, and a part of a control electrode such as a ground electrode disposed on a substrate can also be used. Further, it is possible to improve the absorption efficiency of the leaked light beam, by disposing the metal material via a high refractive index film having a higher refractive index than the slab waveguide.

INDUSTRIAL APPLICABILITY

As described above, according to the optical waveguide element according to the present invention, it is possible to provide an optical waveguide element that controls the propagation path of a leaked light beam such as a high-order mode light beam generated in the branch portion, prevents interference with the waveguide light propagating in the downstream optical waveguide such as another branch portion, and has less deterioration in optical characteristics.

REFERENCE SIGNS LIST 1 substrate
2 optical waveguide
3c-1 first slab waveguide region
3c-2, 3c-3 second slab waveguide region
41, 42 slit

The invention claimed is:

1. An optical waveguide element in which an optical waveguide is formed on a substrate, wherein
in the optical waveguide, at least one of two branched waveguides branched at a first branch portion has a second branch portion,
a slab waveguide is formed between the two branched waveguides,
a slit that divides the slab waveguide into a first slab waveguide region near the first branch portion and a second slab waveguide region near the second branch portion is formed between the first branch portion and the second branch portion, and
the first slab waveguide region is arranged from near the first branch portion, and extended along an optical waveguide formed a downstream side of the second branch portion, avoiding the vicinity of the second branch portion.

2. The optical waveguide element according to claim 1, wherein
a refractive index of the slit is set lower than a refractive index of the slab waveguide region.

3. The optical waveguide element according to claim 1, wherein
a shape of a boundary between the slit and the second slab waveguide region has a plurality of protruding portions projecting into the second slab waveguide region, and is set such that a high-order mode light beam propagating in the second slab waveguide region travels into the first slab waveguide region or to an outside an entire optical waveguide.

4. The optical waveguide element according to claim 1, wherein
the optical waveguide includes a Y-branch coupler that combines the two branched waveguides branched at the first branch portion, and
a shape of a portion of the first slab waveguide region close to the Y-branch coupler is set such that a high-order mode light beam output from the first slab waveguide region travels to cross the branched waveguide while avoiding the Y-branch coupler.

5. The optical waveguide element according to claim 1, wherein
an absorbent material that absorbs a high-order mode light beam propagating in the slab waveguide is disposed in at least a part of the first slab waveguide region.

6. An optical waveguide element in which an optical waveguide is formed on a substrate, wherein
in the optical waveguide, each of two branched waveguides branched at a first branch portion has a second branch portion,
a slab waveguide is formed between the two branched waveguides,
the slab waveguide is divided into a first slab waveguide region and two second slab waveguide regions sandwiching the first slab waveguide region by two slits formed side by side with the two branched waveguides,
the first slab waveguide region is arranged from near the first branch portion, and extended along an optical waveguide formed a downstream side of the second branch portion, avoiding the vicinity of the second branch portion, and
each of the second slab waveguide regions is disposed near the second branch portion.

7. The optical waveguide element according to claim 6, wherein a refractive index of the slits is set lower than a refractive index of the slab waveguide region.

8. The optical waveguide element according to claim 6, wherein a shape of a boundary between one of the slits and one of the second slab waveguide regions near that one of the slits has a plurality of protruding portions projecting into that one of the second slab waveguide regions, and is set such that a high-order mode light beam propagating in that one of the second slab waveguide regions travels into the first slab waveguide region or to an outside an entire optical waveguide.

9. The optical waveguide element according to claim 6, wherein
the optical waveguide includes a Y-branch coupler that combines the two branched waveguides branched at the first branch portion, and
a shape of a portion of the first slab waveguide region close to the Y-branch coupler is set such that a high-order mode light beam output from the first slab waveguide region travels to cross the branched waveguide while avoiding the Y-branch coupler.

10. The optical waveguide element according to claim 6, wherein an absorbent material that absorbs a high-order mode light beam propagating in the slab waveguide is disposed in at least a part of the first slab waveguide region.

* * * * *